United States Patent [19]

Noack et al.

[11] 4,236,797
[45] Dec. 2, 1980

[54] MIRROR MECHANISM FOR A MONOCULAR REFLEX CAMERA

[75] Inventors: Rolf Noack, Dresden; Karl Krömer, Radebeul; Hans Zimmet, Dresden, all of German Democratic Rep.

[73] Assignee: VEB Pentacon Dresden Kamera- und Kinowerke, Dresden, German Democratic Rep.

[21] Appl. No.: 39,980

[22] Filed: May 17, 1979

[30] Foreign Application Priority Data

Jun. 19, 1978 [DD] German Democratic Rep. ... 206097

[51] Int. Cl.³ .............................................. G03B 19/12
[52] U.S. Cl. ..................................... 354/152; 354/246
[58] Field of Search ................................ 354/152–158, 354/245, 246

[56] References Cited

U.S. PATENT DOCUMENTS

| 4,096,505 | 6/1978 | Onda et al. ........................... 354/246 |
| 4,160,592 | 7/1979 | Noack et al. ...................... 354/153 X |

*Primary Examiner*—John Gonzales
*Attorney, Agent, or Firm*—James Creighton Wray

[57] ABSTRACT

The invention relates to a mirror mechanism for a monocular reflex camera with a laminated focal plane shutter, in which at least the opening blades of the shutter are automatically guided back into their initial positions by a spring-operated guidance member after the exposing procedure.

To simplify construction of the opening blades return mechanism there is provided an arm on the shutter return mechanism which is capable of being coupled to the swivel lever for the viewfinder mirror when the opening blades move back. The swivel lever can be moved back against the action of a spring and held by a catch.

3 Claims, 11 Drawing Figures

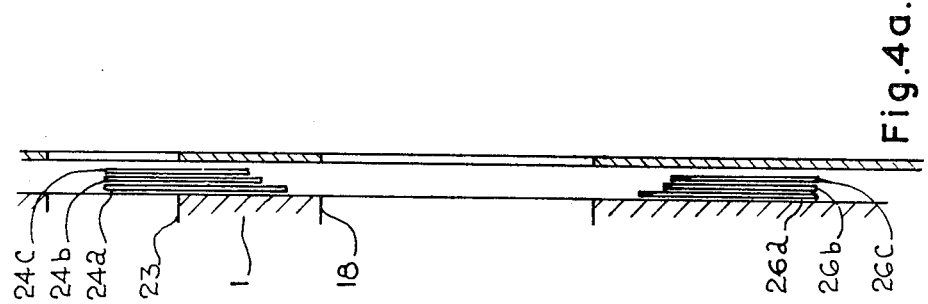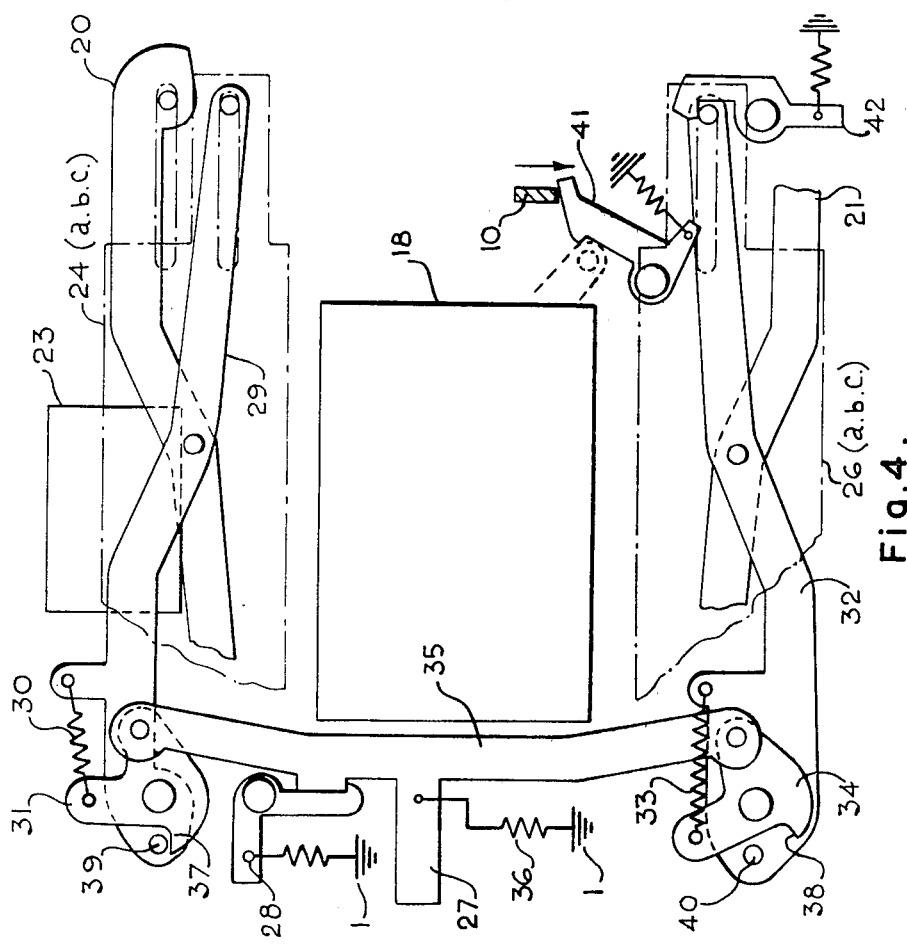

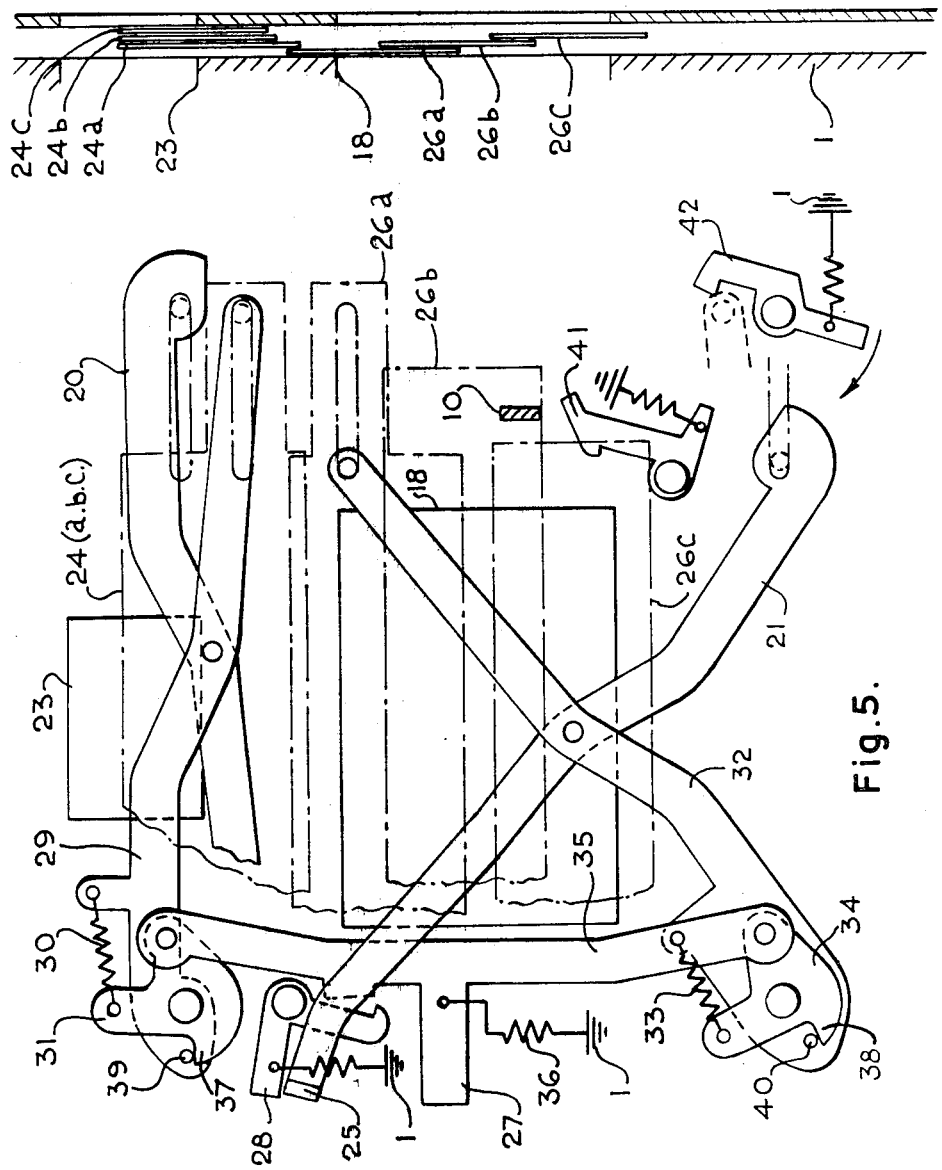

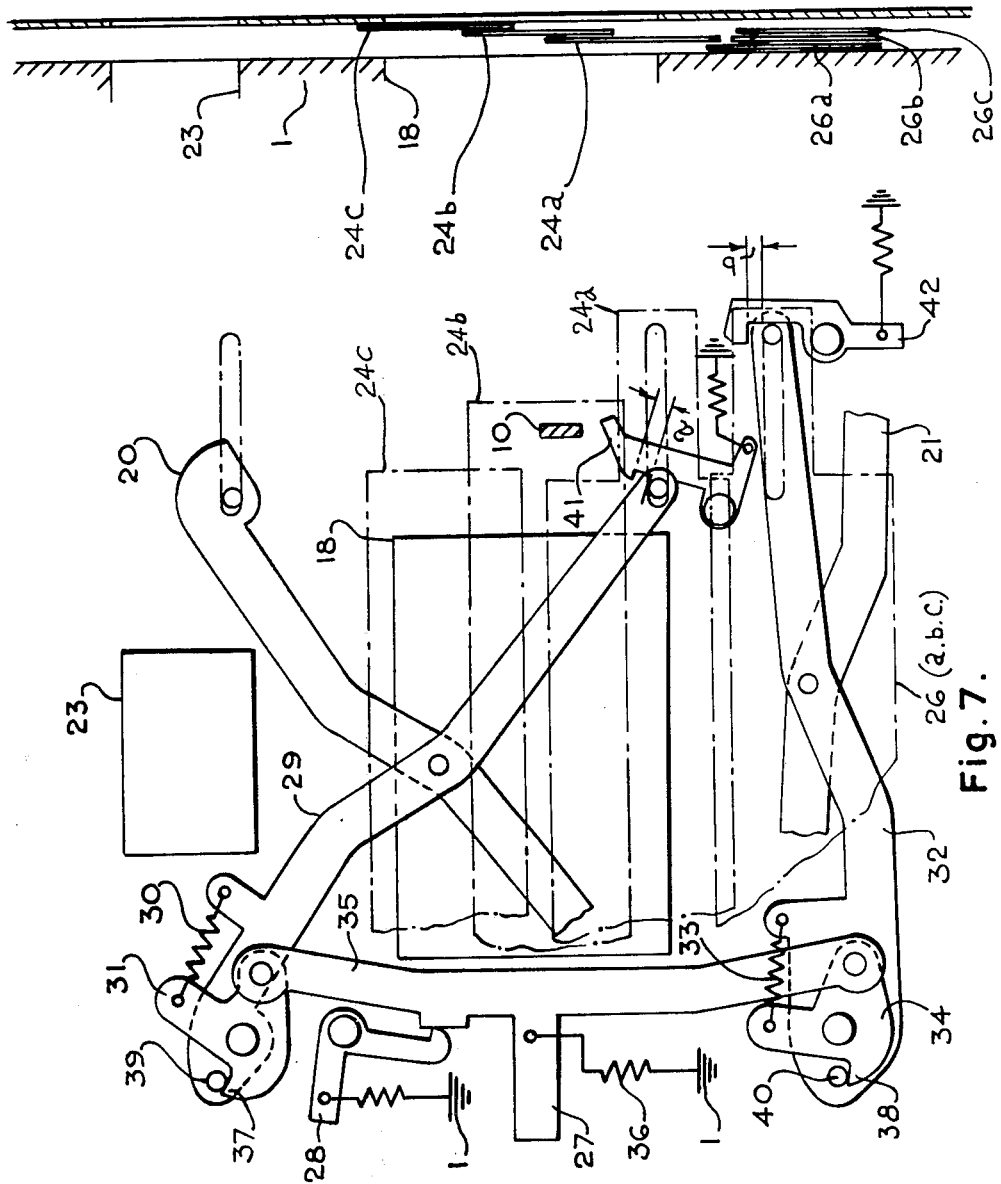

MIRROR MECHANISM FOR A MONOCULAR REFLEX CAMERA

BACKGROUND TO THE INVENTION

The invention relates to a mirror mechanism for a monocular reflex camera with a laminated focal plane shutter, in which at least the opening blades of the shutter are automatically guided back into their initial, positions by a spring-operated guidance member after the exposing procedure.

STATEMENT OF PRIOR ART

In one known mirror mechanism, there is coordinated with the swivel lever for the viewfinder mirror a return spring lever which is released to move by the closing blades which move into the closing position, and itself releases the guidance member for the shutter blades. This gearing structure is complicated, as a result of the plurality of levers acting in succession, gives rise not only to operational disturbances but also delays the initiation of the new ready-for-use position, since the shutter mechanism can only return to its initial position after an at least partial return movement of the viewfinder mirror.

OBJECT OF THE INVENTION

With the object of operationally secure accceleration of the return of the shutter blades and the mirror mechanism to the new ready-for-use position, the problem of the invention is to produce a simplified construction of the return guidance mechanism.

SUMMARY OF THE INVENTION

According to the invention there is provided a lamellar focal-plane shutter for monocular mirror reflex cameras having a swivelling viewfinder mirror movable between a first viewing position in the optical path of the camera and a second position clear of said path for exposure and shutter blades which return automatically to their starting positions after each exposure operation, comprising a drive member for returning said shutter blades and movable between a rest position and a tensioned position, a first spring attached to said rod for tensioning upon cocking of the camera, a first detent lever for holding said drive member in a tensioned position, means on said shutter for actuating said detent lever when the shutter arrives at its closed positioned, a pivoted lever for driving said reflex mirror from its first position to its second position, a second spring connected to said pivoted lever to urge the reflex mirror towards its second position, a second detent lever for holding said pivoted lever in a cocked position against the action of said second spring, and an arm disposed on said drive member and engageable with said pivoted lever to drive the latter during a return movement of the drive member to its rest position, whereby on release of said drive member the latter moves under the tension of said first spring to drive simultaneously said shutter blades into their starting positions and to drive said pivoted lever against the action of said second spring permitting the reflex mirror to return to its first position. Apart from the simplified constructional assembly, there is provided through this technological measure the advantage that the guidance of the mirror and the guidance of the shutter blades cannot take place in time order, but the guidance of the shutter blades can take place during the guidance of the viewfinder mirror.

By virtue of one advantageous construction, the viewfinder mirror is loaded with a return spring which attempts to keep the viewfinder mirror in non-positive communication with the swivel lever. By virtue of a further advantageous construction, a simultaneous stop actuation is achieved, since the swivel lever engages with a driving pin in the cavity of an actuating rocker arm for the objective stop.

BRIEF DESCRIPTION OF DRAWINGS

The invention is explained by reference to exemplified embodiments which are illustrated and described.

FIG. 1a shows the corresponding blade position in side view

FIG. 4 shows the shutter in the exposure position

FIG. 4a shows the corresponding blade position in side view

FIG. 5 shows the shutter after the exposing procedure is ended

FIG. 5a shows the corresponding blade position in side view

FIG. 7 shows the shutter after returning to the resting position, and

FIG. 7a shows the corresponding blade position in side view.

DESCRIPTION OF PREFERRED EMBODIMENTS

Figure 1:
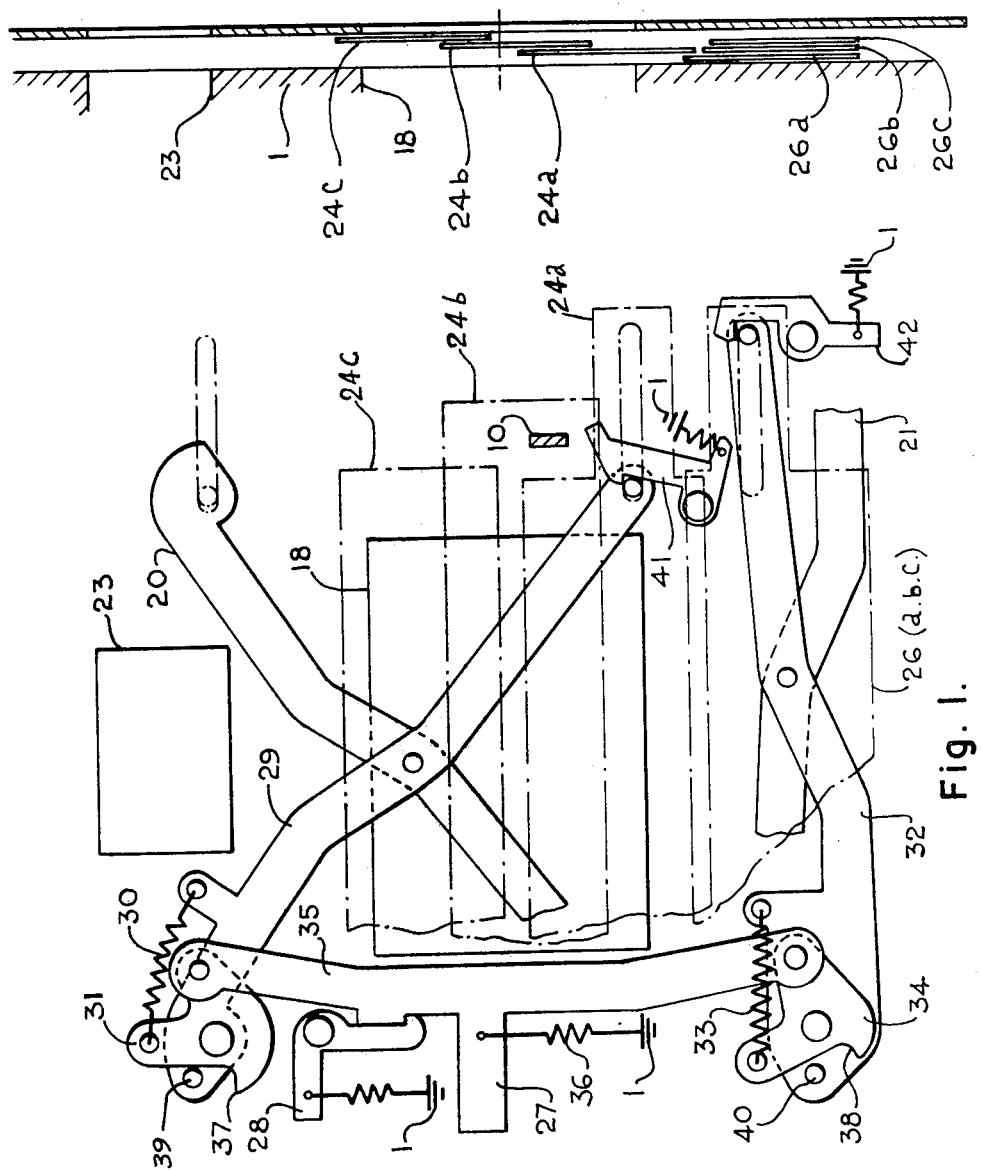
FIG. 1 shows the shutter in the tensioned position

The viewfinder aperture 23, and below it the picture window 18, is provided in the camera housing 1 (see FIG. 1). The picture window 18 can be closed by the opening blades 24 (a, b and c) and the closing blades 26 (a, b, and c). The opening blades 24 can be moved by the opening lever 29 and its shear-lever 21. The opening spring 30 is fastened to the opening lever 29 on the one hand, and to the clamping plate 31 on the other; correspondingly, the closing spring 33 is fastened by one end to the closing lever 32, and by the other end to the clamping plate 34. The opening lever 29 possesses a catch 39, which is located in the swivelling path of the stop 37 of the clamping plate 31. The opening lever 29 can be secured counter to the opening spring 30 by the opening catch 41 and the closing lever 32 can be secured counter to the closing spring 33 by the closing catch 42. The two clamping plates 31 and 34 are connected together by the re-guidance member 35. The re-guidance member 35 can be moved by the re-guidance spring 36 and can be secured by the stop lever 28 counter to the re-guidance spring 36. The re-guidance member 35 has a re-guidance arm 27 for the viewfinder mirror 2.

The viewfinder mirror 2 is rotatably mounted about the shaft 3 (see FIG. 2) in the camera housing 1. The recuperating spring 4 keeps the viewfinder mirror 2 in engagement with the driving pin 5 of the swivel lever 6. The swivel lever 6 projects with the driving pin 7 into the recess 8 of the actuating arm 9. The adjusting push rod 14, which is spring-loaded in the direction of the arrow, of a preselecting stop located in the objective housing 15 which can be placed against the camera housing 1, butts against the actuating tab 13 of the actuating rocker arm 9.

On the locking pin 16 of the swivel lever 6, the latter is retained counter to its swivel spring by the disengaging catch 17. The disengaging arm 10 for the opening catch 41 of the shutter is located on the swivel lever 6.

Figure 2:
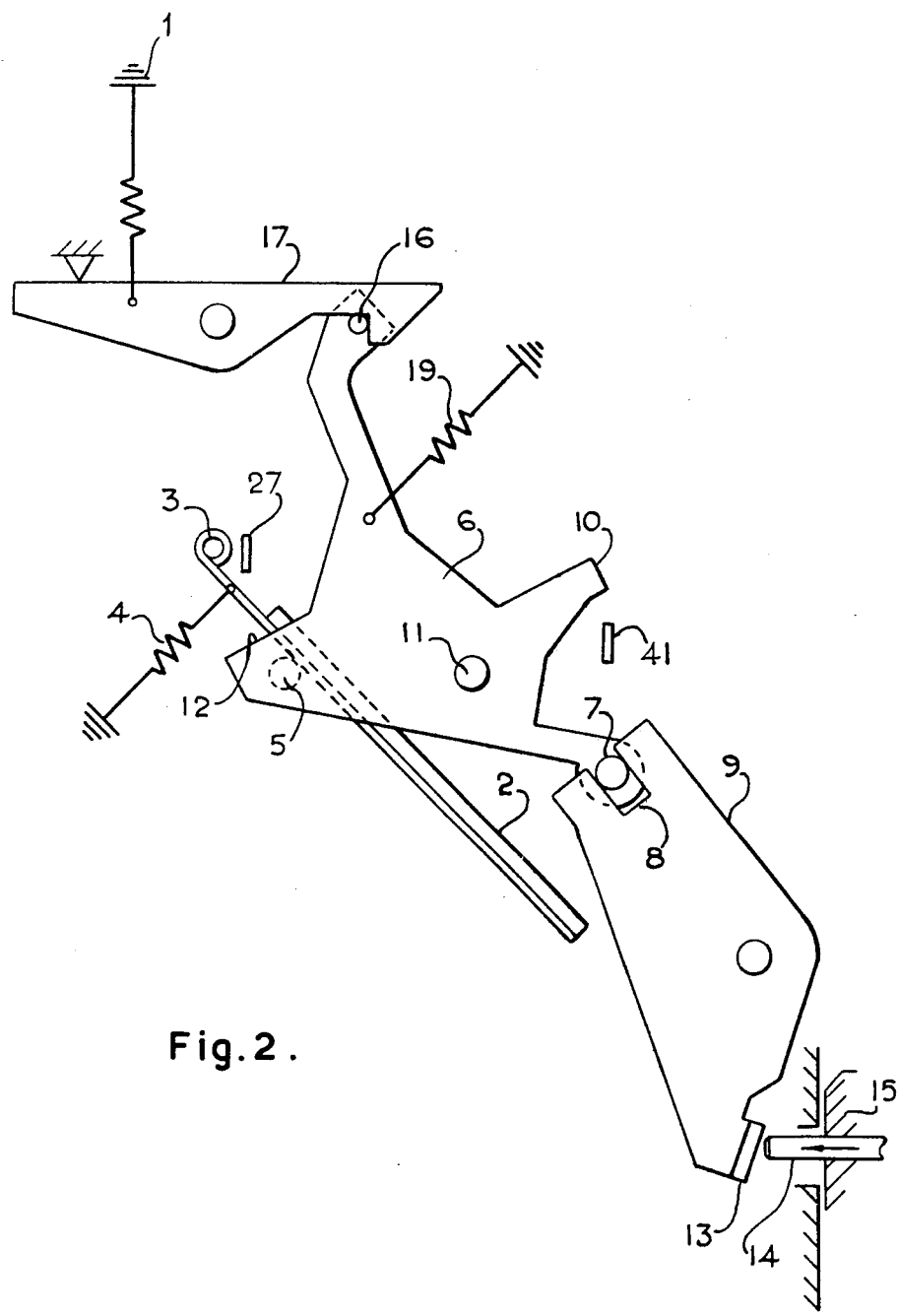
FIG. 2 shows the mirror mechanism in the tensioned position
Figure 3:
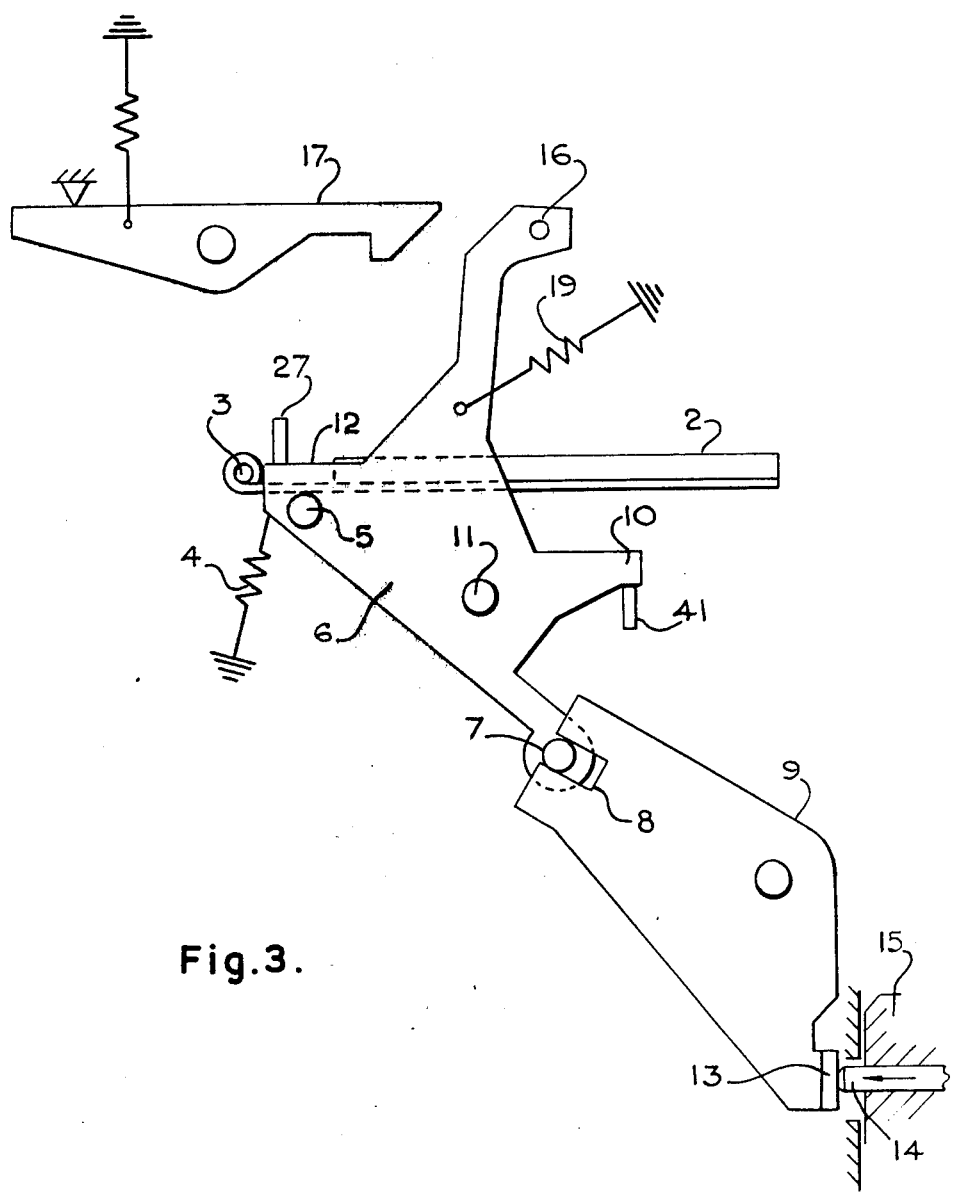
FIG. 3 shows the mirror mechanism in the exposure position
Figure 6:
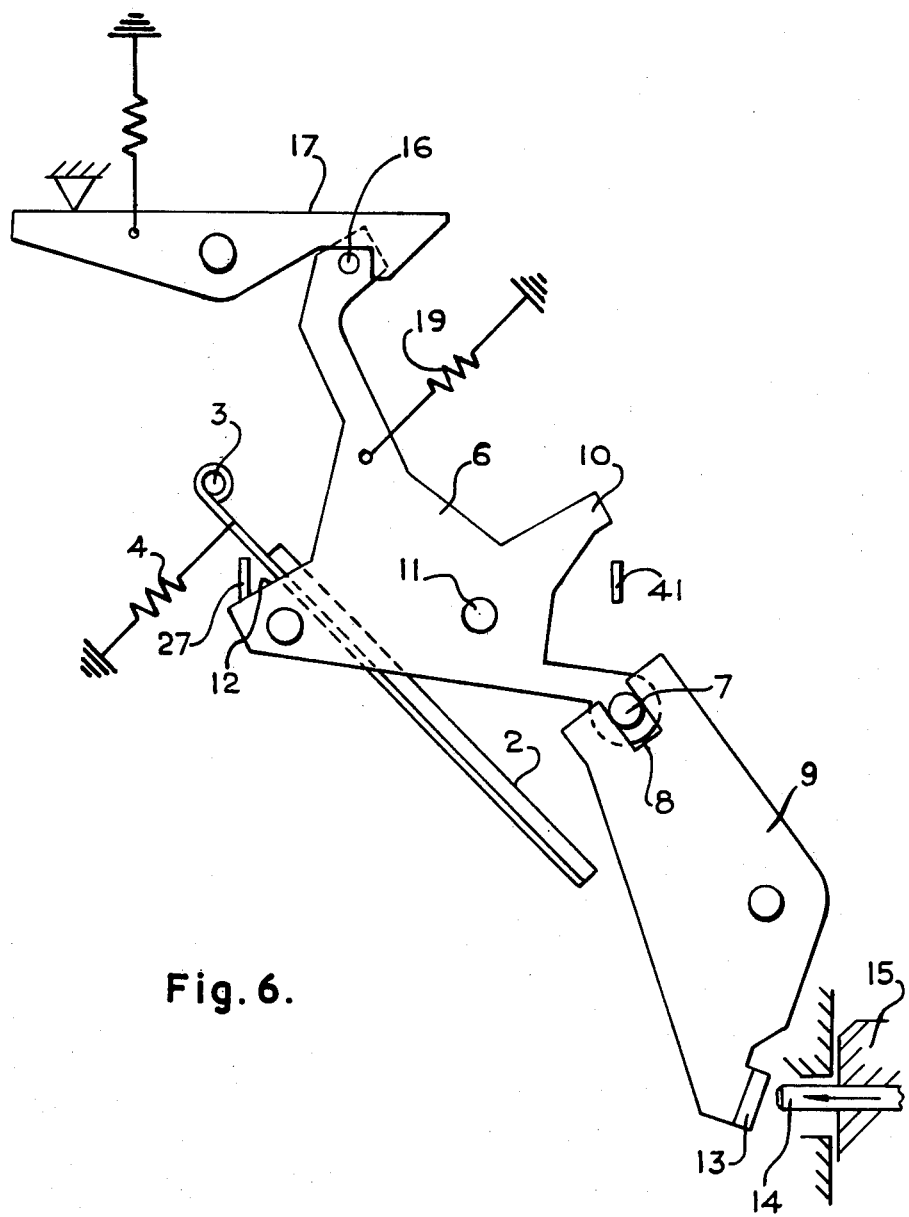
FIG. 6 shows the mirror mechanism after returning to the resting position

The mode of operation of the arrangement is as follows:

When the shutter is tensioned, the parts are in the position as per FIG. 1 or FIG. 1a and FIG. 2. By actuating the disengaging catch 17, the driving lever 6 is released to run its course (see FIG. 3), and because of the driving spring 19, is rotated in clockwise direction about its bearing pin 11. During this movement, the viewfinder mirror 2 is rotated via the driving pin 5 counter to the recuperating spring 4 into the horizontal exposure position, and the actuating rocker arm 9 is rotated via the driving pin 7 in counterclockwise direction into the position as per FIG. 3. Here, the objective-sided adjusting push rod 14 is pressed in counter to the direction of the arrow, so that the objective stop closes at the preselected value.

Thereafter, the driving lever 6 strikes the opening catch 41 (see FIG. 4) and swivels the latter out of engagement with the opening lever 29 in clockwise direction. Because of the opening spring 30, the opening lever 29 and the shear-lever 20 are made to move the opening blades 24a, 24b and 24c; the opening blades 24 (a, b and c) then adopt the position which can also be seen in FIG. 4a, so that the picture window 18 is opened for exposing a film. The catch 39 of the opening lever 29 comes into contact with the stop 37 of the clamping plate 31.

The closing catch 42 is swivelled in known manner in clockwise direction and brought out of engagement with the closing lever 32 by a mechanical or electronic device for producing different exposure times. Because of the closing spring 33, the closing lever 32 and the shear-lever 21 are made to move the closing blades 26a, 26b and 26c; the closing blades 26 (a, b and c) then adopt the position shown in FIGS. 5 and 5a, in which the picture window 18 is closed again. The catch 40 of the closing lever 32 comes into contact with the stop 38 of the clamping plate 34.

When its course is ended, the closing lever 32 with its end 25 strikes the catch lever 28 and swivels the latter in clockwise direction out of engagement with the re-guidance member 35. The re-guidance member 35 is moved downwardly by the re-guidance spring 36, so that the two clamping plates 31 and 34 are rotated in clockwise direction. Here, the clamping plate 31 moves the opening layer 29 by means of the stop 37 via the catch 39, and the clamping plate 34 moves the closing lever 32 by means of the stop 38 via the catch 40 in clockwise direction, so that the opening blades 24 and the closing blades 26 are simultaneously moved into their initial positions. No release of the picture window 18 occurs during this re-guidance of the opening blades 24 and the closing blades 26, so that the film situated behind it is not exposed unintentionally. Through the re-guidance member 35, the opening lever 29 and the closing lever 32 are moved outwardly by the paths a or b through the positions which are defined by the opening catch 41 or the closing catch 42.

During the re-guidance movement of the re-guidance member 35, its re-guidance arm 27 seizes the edge 12 of the swivel lever 6, whereby the swivel lever 6 is driven counter to the swivel spring 19 into its initial position which is retained by the disengaging catch 17. The recuperating spring 4 rotates the viewfinder mirror 2 again into the viewfinder position, following the catch pin 5. Simultaneously, the actuating rocker arm 9 is rotated in clockwise direction, whereby the adjusting push rod 14 can follow the actuating tab 13, so that the objective stop fully opens again.

In the new tensioning procedure, the re-guidance member 35 is moved counter to the re-guidance spring 36 into the position as per FIG. 1, where it is retained by the catch lever 28. In this tensioning movement, the clamping plates 31 and 34 are rotated in counterclockwise direction. Because the opening lever 29 is stopped by the opening catch 41 and the closing lever 32 is stopped by the closing catch 42, the opening spring 30 and the closing spring 33 are tensioned.

We claim:

1. A lamellar focal-plane shutter for monocular mirror reflex cameras having a swivelling viewfinder mirror movable between a first viewing position in the optical path of the camera and a second position clear of said path for exposure and shutter blades which return automatically to their starting positions after each exposure operation, comprising:
   (a) a drive member for returning said shutter blades and movable between a rest position and a tensioned position,
   (b) a first spring attached to said drive member for tensioning upon cocking of the camera,
   (c) a first detent lever for holding said drive member in a tensioned position,
   (d) means on said shutter for actuating said detent lever when the shutter arrives at its closed position,
   (e) a pivoted lever for driving said reflex mirror from its first position to its second position,
   (f) a second spring connected to said pivoted lever to urge the reflex mirror towards its second position,
   (g) a second detent lever for holding said pivoted lever in a cocked position against the action of said second spring, and
   (h) an arm disposed on said drive member and engageable with said pivoted lever to drive the latter during a return movement of the drive member to its rest position,
   whereby on release of said drive member the latter moves under the tension of said first spring to drive simultaneously said shutter blades into their starting positions and to drive said pivoted lever against the action of said second spring permitting the reflex mirror to return to its first position.

2. A camera according to claim 1, including a return spring for biasing said reflex mirror to maintain the reflex mirror in non-positive engagement with the pivoted lever.

3. A camera according to claim 1 including a rocker arm for actuating an objective stop, and a driving pin carried by said pivoted lever engaging a recess formed in said rocker arm, the latter actuating said stop on release of said pivoted lever by said second detent lever.

* * * * *